(12) United States Patent
Feng et al.

(10) Patent No.: US 12,379,043 B2
(45) Date of Patent: Aug. 5, 2025

(54) ELECTRIC VALVE

(71) Applicant: BYD COMPANY LIMITED, Guangdong (CN)

(72) Inventors: Zhongbo Feng, Shenzhen (CN); Ju Jin, Shenzhen (CN); Fugang Wang, Shenzhen (CN); Haijian Sha, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 48 days.

(21) Appl. No.: 18/478,717

(22) Filed: Sep. 29, 2023

(65) Prior Publication Data

US 2024/0026989 A1  Jan. 25, 2024

Related U.S. Application Data

(63) Continuation of application No. PCT/CN2022/093315, filed on May 17, 2022.

(51) Int. Cl.
*F16K 27/02* (2006.01)
*F16K 31/06* (2006.01)

(52) U.S. Cl.
CPC ............ *F16K 27/029* (2013.01); *F16K 31/06* (2013.01); *F16K 2200/3051* (2021.08); *F16K 2200/501* (2021.08); *Y10T 137/5987* (2015.04)

(58) Field of Classification Search
USPC ...... 137/315.03, 315.41, 327; 251/291, 292; 335/257
See application file for complete search history.

(56) References Cited

U.S. PATENT DOCUMENTS 3,195,024 A * 7/1965 Conrath ................. H01H 50/44
  335/257
3,879,068 A * 4/1975 Stampfli ............. F15B 13/0821
  137/271

(Continued)

FOREIGN PATENT DOCUMENTS

CN  203335976 U  12/2013
CN  204127439 U   1/2015

(Continued)

OTHER PUBLICATIONS

English translation of International Search Report from PCT/CN2022/093315 dated Jul. 20, 2022 (2 pages).

*Primary Examiner* — Matthew W Jellett
(74) *Attorney, Agent, or Firm* — Calfee, Halter & Griswold LLP

(57) ABSTRACT

The present disclosure provides an electric valve, including: a valve seat, the valve seat having an end surface and a slot; a valve body, a portion of the valve body penetrating in the valve seat, and another portion of the valve body protruding from the end surface; a coil portion sleeved over the valve body, the coil portion and the slot being respectively located on two sides of the end surface; and a connection portion, the connection portion including a connection member and a support member and a clamping member arranged on the connection member. The connection member is fixedly connected to the coil portion, the support member abuts against the end surface, and the clamping member is clamped with the slot.

10 Claims, 4 Drawing Sheets

(56) References Cited

U.S. PATENT DOCUMENTS

| | | | | |
|---|---|---|---|---|
| 4,313,595 A | * | 2/1982 | Markley | F16M 1/00 |
| | | | | 248/674 |
| 4,683,453 A | * | 7/1987 | Vollmer | H01F 7/1607 |
| | | | | 335/278 |
| 5,634,486 A | * | 6/1997 | Hatting | F16K 5/0442 |
| | | | | 403/361 |
| 6,305,870 B1 | * | 10/2001 | Mita | F16B 9/056 |
| | | | | 411/522 |
| 6,848,672 B2 | * | 2/2005 | Cross | F16K 31/055 |
| | | | | 285/921 |
| 8,632,054 B2 | * | 1/2014 | Carlson | F16K 27/00 |
| | | | | 251/304 |
| 8,753,139 B2 | * | 6/2014 | Moosmann | F16H 61/0003 |
| | | | | 439/350 |
| 10,139,006 B2 | * | 11/2018 | Muraoka | H01F 7/126 |
| 12,188,525 B2 | * | 1/2025 | Dial | F16K 31/0655 |
| 2019/0178370 A1 | * | 6/2019 | Dick | F16K 31/0613 |

FOREIGN PATENT DOCUMENTS

| | | |
|---|---|---|
| CN | 110159820 A | 8/2019 |
| CN | 111911697 A | 11/2020 |
| EP | 3754815 A1 | 12/2020 |
| JP | 2000074245 A | 3/2000 |
| JP | 2003130244 A | 5/2003 |
| JP | 2004263823 A | 9/2004 |
| JP | 2011208729 A | 10/2011 |
| JP | 2019094916 A | 6/2019 |

\* cited by examiner

ELECTRIC VALVE

CROSS-REFERENCE TO RELATED APPLICATIONS

The present disclosure is a bypass continuation application of PCT International Patent Application No. PCT/CN2022/093315, filed on May 17, 2022, which claims priority to and benefits of both Chinese Patent Application No. 202110706425.4, entitled "ELECTRIC VALVE", filed on Jun. 24, 2021, and Chinese Patent Application No. 202121420800.0, entitled "ELECTRIC VALVE", filed on Jun. 24, 2021, which are incorporated herein by reference in their entireties.

FIELD

The present disclosure relates to the technical field of electric valves, and more specifically, to an electric valve.

BACKGROUND

An electric valve includes a valve seat, a valve body, and a coil portion. The coil portion is energized to generate a magnetic field, and the magnetic field drives a valve head in the valve body to move, thereby achieving actions of opening and closing a valve port, and the like. In the related art, when the coil portion is mounted, the coil portion needs to be connected to the valve seat through fasteners such as screws. This requires operations of aligning screw holes and tightening the screws, resulting in low assembly efficiency of the electric valve. Moreover, when the electric valve operates under vibration-prone conditions, the screws are prone to loosening, which affects reliability of the electric valve.

SUMMARY

The present disclosure provides an electric valve to improve the assembly efficiency and reliability of the electric valve.

In order to achieve the foregoing objective, the present disclosure provides an electric valve, including: a valve seat, the valve seat having an end surface and a slot; a valve body, a portion of the valve body penetrating in the valve seat, and another portion of the valve body protruding from the end surface; a coil portion sleeved over the valve body, the coil portion and the slot being respectively located on two sides of the end surface; and a connection portion, the connection portion including a connection member and a support member and a clamping member arranged on the connection member. The connection member is fixedly connected to the coil portion, the support member abuts against the end surface, and the clamping member is clamped with the slot.

The support member might be an elastic structure.

The support member may include an arc-shaped plate and a limiting plate connected to each other. The arc-shaped plate may be connected to the connection member. The limiting plate may abut against the end surface. The limiting plate may be spaced from the connection member. The limiting plate may be obliquely arranged relative to the end surface.

Multiple support members may be provided and arranged around the valve body.

The valve seat may include a main body and a limiting portion. The end surface may be located on the main body, the main body has a step structure. The limiting portion may be located on a side surface of the step structure. The slot may be located in a region between the limiting portion and a bottom surface of the step structure.

The limiting portion is provided with a limiting groove. The limiting groove may extend in an axial direction of the valve body. The clamping member may include a connection plate and a clamping hook. Two ends of the connection plate may be respectively connected to the connection member and the clamping hook. The clamping hook may be clamped with the slot. The connection plate may be in limiting fit with the limiting groove.

The connection portion may further include a wrenching member. The wrenching member may be connected to a middle of the clamping member.

The connection member may be a ring structure. Multiple through holes may be distributed on the connection member. The coil portion may be provided with multiple convex pillars. The multiple convex pillars may be in corresponding limiting fit with the multiple through holes one by one.

The connection portion may be an integrated structure made of a metal material.

The valve body may be in threaded connection with the valve seat.

A concave structure may be arranged at a joint between the connection member and the clamping member.

The technical solution of the present disclosure provides an electric valve. The electric valve includes a valve seat, a valve body, a coil portion, and a connection portion. The valve seat has an end surface and a slot. A portion of the valve body penetrates in the valve seat, and another portion of the valve body protrudes from the end surface. The coil portion is sleeved over the valve body, and the coil portion and the slot are respectively located on two sides of the end surface. The connection portion includes a connection member and a support member and a clamping member arranged on the connection member. The connection member is fixedly connected to the coil portion, the support member abuts against the end surface, and the clamping member is clamped with the slot. Applying this solution, when the coil portion is mounted, the clamping member of the connection portion is clamped with the slot on the valve seat; and after clamping, the support member abuts against the end surface of the valve seat, so that two axial directions of the coil portion can be limited to make the reliable connection between the coil portion and the valve seat. Therefore, the connection can be completed while sleeving the coil portion over the valve body without tightening screws, thereby improving the assembly efficiency; and the connection will not loosen when applied in a vibration environment.

DETAILED DESCRIPTION

Figure 1:
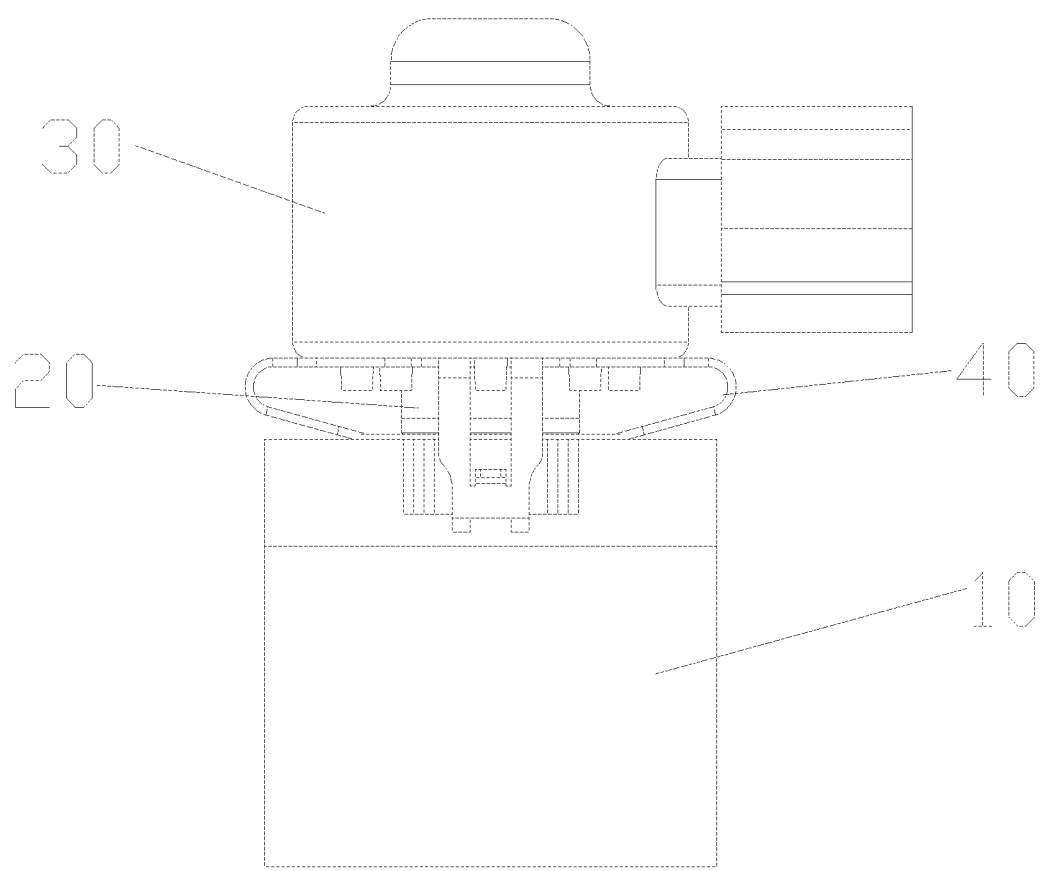
FIG. 1 shows a schematic structural view of an in-line electric valve provided in an embodiment of the present disclosure.

The technical solutions in the embodiments of the present disclosure will be clearly and completely described below with reference to the accompanying drawings in the embodiments of the present disclosure. Apparently, the described embodiments are only some embodiments rather than all the embodiments of the present disclosure. The following descriptions of at least one exemplary embodiment are merely illustrative, and in no way constitute any limitation on the present disclosure and the application or use of the present disclosure. All other embodiments obtained by a person of ordinary skill in the art based on the embodiments of the present disclosure without making creative efforts shall fall within the protection scope of the present disclosure.

The following detailed description will illustrate the general principles of the invention, examples of which are additionally illustrated in the accompanying drawings. In the drawings, like reference numbers indicate identical or functionally similar elements.

As shown in FIG. 1 to FIG. 5, an embodiment of the present disclosure provides an electric valve, including: a valve seat 10, the valve seat 10 having an end surface 11 and a slot 12; a valve body 20, a portion of the valve body 20 penetrating in the valve seat 10, and another portion of the valve body 20 protruding from the end surface 11; a coil portion 30 sleeved over the valve body 20, the coil portion 30 and the slot 12 being respectively located on two sides of the end surface 11; and a connection portion 40, the connection portion 40 including a connection member 41 and a support member 42 and a clamping member 43 arranged on the connection member 41. The connection member 41 is fixedly connected to the coil portion 30, the support member 42 abuts against the end surface 11, and the clamping member 43 is clamped with the slot 12.

In this embodiment, a portion of the valve body 20 penetrates in the valve seat and another portion of the valve body 20 protrudes from the end surface 11, thereby facilitating the corresponding arrangement between the coil portion 30 and the connection portion 40 as well as the valve seat 10. The coil portion 30 is located above the end surface 11, and the slot 12 is located below a side of the end surface 11, thereby facilitating the connection between the connection portion 40 connected to the coil portion 30 and the valve seat 10. The connection member 41 is fixedly connected to the coil portion 30, the support member 42 abuts against the end surface 11, and the clamping member 43 is clamped with the slot 12, thereby the connection portion 40 fixedly connecting to the valve seat 10.

When the coil portion 30 is mounted, the clamping member 43 of the connection portion 40 is clamped with the slot 12 on the valve seat 10; and after clamping, the support member 42 abuts against the end surface 11 of the valve seat 10, so that two axial directions of the coil portion 30 can be limited to make the reliable connection between the coil portion 30 and the valve seat 10. Therefore, the connection can be completed while sleeving the coil portion 30 over the valve body 20 without tightening screws, thereby improving the assembly efficiency; and the connection will not loosen when applied in a vibration environment.

Specifically, the support member 42 is an elastic structure. The support member 42 adopts an elastic structure, which can better play supporting and limiting roles when the coil portion 30 and the valve seat 10 are connected by the connection portion 40, and can also better play a fastening role after the coil portion 30 and the valve seat 10 are fixed. During assembly and disassembly, due to the possibility of an elastic deformation of the support member 42, it is convenient to clamp the clamping member 43 into the slot 12 or remove the clamping member from the slot 12.

Further, the support member 42 includes an arc-shaped plate 44 and a limiting plate 45 connected to each other, the arc-shaped plate 44 is connected to the connection member 41, and the limiting plate 45 abuts against the end surface 11. The limiting plate 45 is spaced from the connection member 41, and the limiting plate 45 is obliquely arranged relative to the end surface 11. The support member 42 adopts the arc-shaped plate 44, which can play a role in buffering radial force generated when the support member 42 abuts against the end surface 11, so as to protect the connection between the support member 42 and the connection member 41. In addition, by adopting the manner of obliquely arranging the limiting plate 45 relative to the end surface 11, the limiting plate 45 is prone to an elastic deformation. Abutting the limiting plate 45 of the support member 42 against the end surface 11, can have a better limiting effect.

In some embodiments, multiple support members 42 are provided and arranged around the valve body 20. Applying multiple support members 42 collectively reduces the pressure borne by each support member 42 during abutting to protect the entire connection portion 40. Meanwhile, the fastening effect is better after the support member 42 mating with the valve seat 10.

Figure 3:
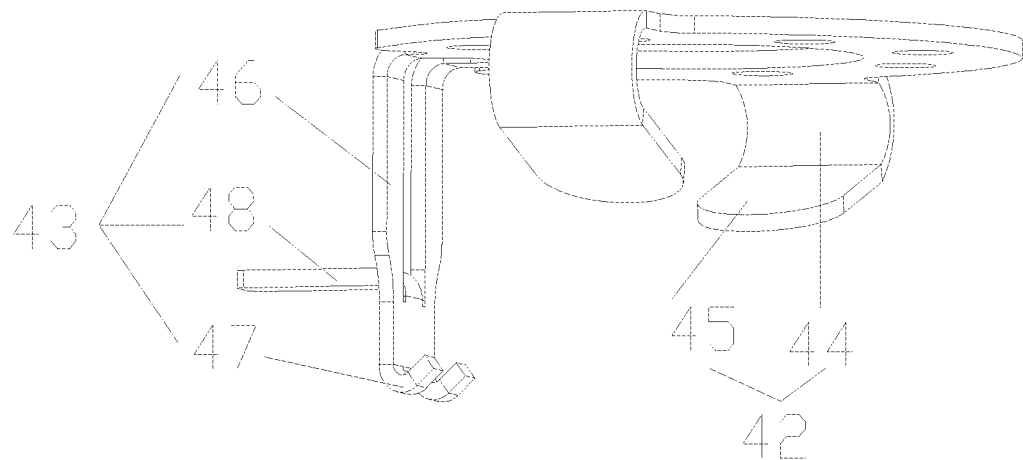
FIG. 3 shows a schematic structural view of a connection portion in FIG. 2.
Figure 4:
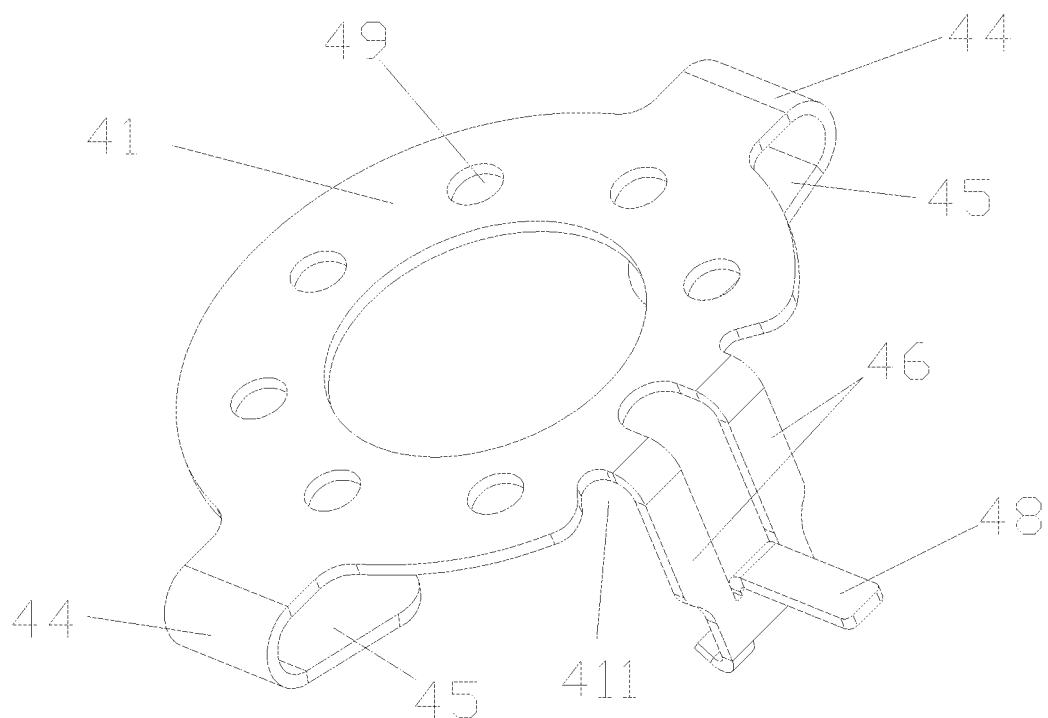
FIG. 4 shows another schematic structural view of the connection portion in FIG. 3.
Figure 5:
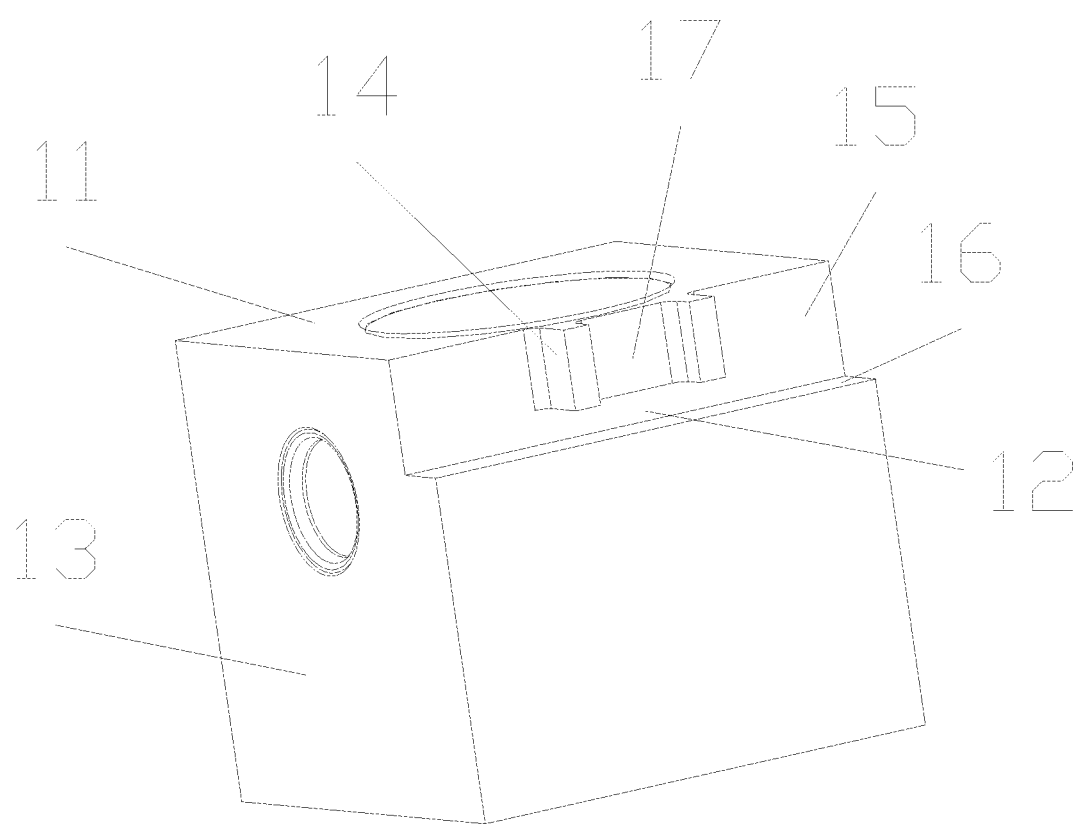
FIG. 5 shows a schematic structural view of a valve seat in FIG. 2.

As shown in FIG. 3 to FIG. 5, the valve seat 10 includes a main body 13 and a limiting portion 14. The end surface 11 is located on the main body 13. The main body 13 has a step structure. The limiting portion 14 is located on a side surface 15 of the step structure. The slot 12 is located in a region between the limiting portion 14 and a bottom surface 16 of the step structure. Through the foregoing structural arrangement, the slot 12 can be located on the valve seat 10 to mate with the connection portion 40.

In this embodiment, the main body 13 in the valve seat 10 has a step structure, and the limiting portion 14 is located on the step structure and forms the slot 12 with the side surface 15 of the step structure and the bottom surface 16 of the step structure, thereby facilitating the processing of the slot 12 and the placement of the limiting portion 14. Moreover, the step structure provided by the main body 13 can be used to form the slot, so the structure is simple, and the processing is convenient.

The limiting portion 14 is provided with a limiting groove 17, and the limiting groove 17 extends in an axial direction of the valve body 20. The clamping member 43 includes a connection plate 46 and a clamping hook 47, and two ends of the connection plate 46 are respectively connected to the connection member 41 and the clamping hook 47. The clamping hook 47 is clamped with the slot 12, and the connection plate 46 is in limiting fit with the limiting groove 17.

The clamping hook 47 is clamped with the slot 12, and the connection plate 46 is in limiting fit with the limiting groove 17, thereby facilitating the clamping between the clamping hook 47 and the slot 12. Furthermore, through the limiting fit between the connection plate 46 and the limiting groove 17, the connection plate 46 can be limited in a circumferential direction, so as to limit the coil portion 30 in the circumferential direction. Two ends of the connection plate 46 are respectively connected to the connection member 41 and the clamping hook 47, and after clamping, the support member 42 abuts against the end surface 11 of the valve seat 10, so that two axial directions of the coil portion 30 can be limited to make the reliable connection between the coil portion 30 and the valve seat 10.

As shown in FIG. 3 and FIG. 4, the connection portion 40 further includes a wrenching member 48, and the wrenching member 48 is connected to a middle of the clamping member 43. During an operation, a person can wrench the wrenching member 48 to drive the clamping member 43 to move. The wrenching member 48 is arranged at the middle of the clamping member 43, and may play some regulatory role in the clamping process to prevent the clamping hook 47 on the connection portion 40 from inconvenience during clamping or disassembling.

Figure 2:
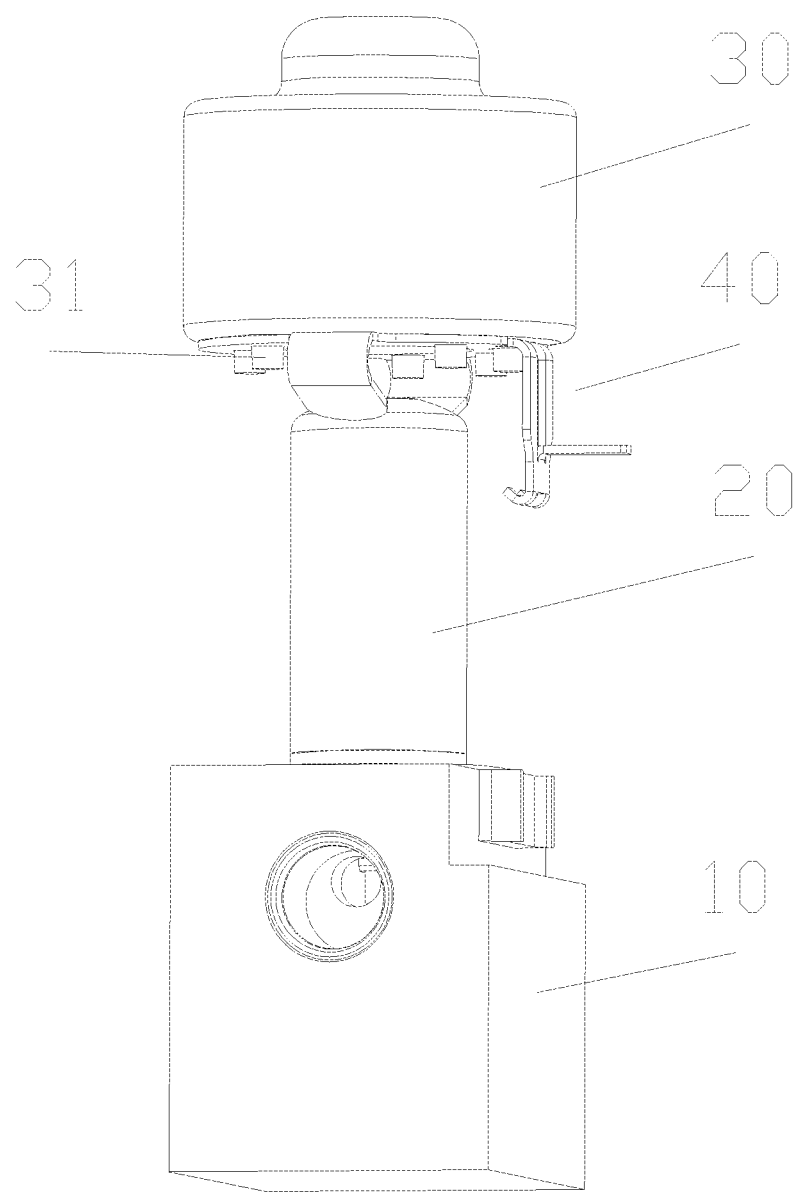
FIG. 2 shows a schematic view of a mounting manner of the in-line electric valve in FIG. 1.

As shown in FIG. 2, the connection member 41 is a ring structure which can avoid the valve body 20, so that the valve body 20 can pass through the connection member 41. Multiple through holes 49 are distributed on the connection member 41, the coil portion 30 is provided with multiple convex pillars 31, and the multiple convex pillars 31 are in corresponding limiting fit with the multiple through holes 49 one by one. By adopting this fit manner, the coil portion 30 and the connection portion 40 can be better limited. Moreover, the multiple convex pillars 31 are in limiting fit with the through holes 49 one by one, so that the stability of the structure can be further ensured. The convex pillars 31 may be fixedly connected to the through holes 49 in a manner of riveting or welding.

Specifically, the connection portion 40 is an integrated structure made of a metal material. The connection portion 40 is made of the metal material which has relatively high mechanical strength, so that the connection strength between the valve seat 10 and the coil portion 30 can be improved. The connection portion 40 may be configured to be a sheet metal part or a stamped part, so that the processing is facilitated, and the cost is low.

Specifically, the valve body 20 is in threaded connection (not shown) with the valve seat 10. By threaded connection, the mounting is easy, the disassembly is convenient, and the operation is simple.

As shown in FIG. 4, a concave structure 411 is arranged at a joint between the connection member 41 and the clamping member 43. This design can avoid a problem of inconvenient mounting and disassembly caused by excessive rigidity of the clamping member 43, and improve elasticity.

It should be noted that the embodiments are not limited in their application or use to the details of construction and arrangement of parts and steps illustrated in the drawings and description. Features of the illustrative embodiments, constructions, and variants may be implemented or incorporated in other embodiments, constructions, variants, and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limiting the invention.

Having described the disclosure in detail and by reference to preferred embodiments thereof, it will be apparent that modifications and variations are possible without departing from the scope of the invention which is defined in the appended claims. Reference numerals:

10: valve seat; 11: end surface; 12: slot; 13: main body; 14: limiting portion; 15: side surface; 16: bottom surface; 17: limiting groove; 20: valve body; 30: coil portion; 31: convex pillar; 40: connection portion; 41: connection member; 411: concave structure; 42: support member; 43: clamping member; 44: arc-shaped plate; 45: limiting plate; 46: connection plate; 47: clamping hook; 48: wrenching member; and 49: through hole.

What is claimed is:

1. An electric valve, comprising:
a valve seat, the valve seat having an end surface and a slot;
a valve body, a portion of the valve body penetrating in the valve seat, and another portion of the valve body protruding from the end surface;
a coil portion sleeved over the valve body, the coil portion and the slot being located on two sides of the end surface; and
a connection portion, the connection portion comprising a connection member, and a support member and a clamping member arranged on the connection member, wherein the connection member is fixedly connected to the coil portion, the support member abuts against the end surface, and the clamping member is clamped with the slot;
wherein the valve seat comprises a main body and a limiting portion extending from a side surface of the main body to define an upper portion of the slot, the main body including a bottom surface extending from the side surface to define a lower portion of the slot; and
wherein the limiting portion includes a limiting groove, wherein the clamping member includes a connection plate in limiting fit with the limiting groove to prevent movement of the connection plate in a circumferential direction.

2. The electric valve according to claim 1, wherein the support member is an elastic structure.

3. The electric valve according to claim 1, wherein the support member comprises an arc-shaped plate and a limiting plate connected to each other, the arc-shaped plate is connected to the connection member, and the limiting plate abuts against the end surface, wherein the limiting plate is spaced from the connection member, and the limiting plate is obliquely arranged relative to the end surface.

4. The electric valve according to claim 1, wherein a plurality of support members are provided and arranged around the valve body.

5. The electric valve according to claim 1, wherein
the limiting groove extends in an axial direction of the valve body; and
the clamping member comprises a clamping hook, and two ends of the connection plate are connected to the connection member and the clamping hook, wherein the clamping hook is clamped with the slot.

6. The electric valve according to claim 1, wherein the connection portion further comprises a wrenching member, and the wrenching member is connected to a middle of the clamping member.

7. The electric valve according to claim 1, wherein the connection member is a ring structure, a plurality of through holes are distributed on the connection member, the coil portion is provided with a plurality of convex pillars, and the plurality of convex pillars are in corresponding limiting fit with the plurality of through holes one by one.

8. The electric valve according to claim 1, wherein the connection portion is an integrated structure made of a metal material.

9. The electric valve according to claim 1, wherein a concave element is arranged at a joint between the connection member and the clamping member.

10. The electric valve according to claim 1, wherein the limiting portion includes a middle portion defining a clamping hook engaging portion of the slot, and first and second side walls extending from the middle portion to define first and second sides of the limiting groove.

* * * * *